United States Patent [19]

Mizukami

[11] Patent Number: 5,496,606
[45] Date of Patent: Mar. 5, 1996

[54] MAGNETIC RECORDING MEDIUM

[75] Inventor: Makoto Mizukami, Yokosuka, Japan

[73] Assignee: Victor Company of Japan, Ltd., Yokohama, Japan

[21] Appl. No.: 272,657

[22] Filed: Jul. 11, 1994

Related U.S. Application Data

[63] Continuation of Ser. No. 798,930, Nov. 29, 1991, abandoned.

[30] Foreign Application Priority Data

Nov. 30, 1990 [JP] Japan ................ 2-336119

[51] Int. Cl.$^6$ .............. B32B 3/02; B32B 3/10; B32B 5/16; G11B 5/66
[52] U.S. Cl. .......... 428/65.3; 428/64.2; 428/141; 428/156; 428/336; 428/408; 428/432; 428/687; 428/694 T; 428/694 TR; 428/694 TS; 428/694 ST; 428/694 SG; 428/698; 428/900
[58] Field of Search ................ 428/64, 65, 156, 428/900, 694 T, 694 TR, 694 ST, 694 TS, 694 SG, 336, 408, 432, 687, 141, 698, 64.2, 65.3

[56] References Cited

U.S. PATENT DOCUMENTS

| | | | |
|---|---|---|---|
| 4,245,008 | 1/1981 | Michaelson | 428/611 |
| 4,698,251 | 10/1986 | Fukuda | 428/64 |
| 4,735,840 | 4/1988 | Hedgcoth | 428/65 |
| 4,776,938 | 10/1988 | Abe | 204/192.15 |
| 5,082,747 | 1/1992 | Hedgcoth | 428/611 |
| 5,087,481 | 2/1992 | Chen et al. | 427/129 |
| 5,413,873 | 5/1995 | Mizukami | 428/611 |

FOREIGN PATENT DOCUMENTS 2-9016  1/1990  Japan .

OTHER PUBLICATIONS

IEEE Trans. May vol. MAG–23, No. 5 579 (1986).

J. Appl. Phys. 55(5) 15, Mar. 1984.

*Primary Examiner*—Leszek Kiliman
*Attorney, Agent, or Firm*—Jacobson, Price, Holman & Stern

[57] ABSTRACT

A magnetic recording medium comprising:

a precoat layer formed on a circular glass substrate to which a texturing treatment is applied in a circumferential direction; and an undercoat film and a magnetic film formed in order on said precoat layer, whereby an axis of easy magnetization is formed so as to become a circumferential direction of a medium.

1 Claim, No Drawings

MAGNETIC RECORDING MEDIUM

This is a Continuation of application Ser. No. 07/798,930, filed Nov. 29, 1991, which was abandoned upon the filing hereof.

FIELD OF THE INVENTION

This invention relates to a magnetic recording medium for a magnetic disc, etc.

BACKGROUND OF THE INVENTION

Generally, as a magnetic disc of a thin film type, there is used such that NiP is polished on a Al base as a substrate. As a means for giving a magnetic anisotropy of a magnetic disc using this substrate to a circumferential direction which is a head running direction, there is a process for applying texturing [texturing means attaching fine scratches by a grinding tape in circumferential direction] to a surface of a substrate. On a substrate texturing treated is formed Cr film followed by forming a Co alloy film to obtain a magnetic recording medium. For using as products, it is necessary to provide a carbon film, as a lubricating layer, upon which a lubricating layer is formed.

Recently, as a high density is achieved in magnetic recording, so narrow track, narrow gap, narrow spacing between head and disc, etc. have been intended to achieve as a countermeasure. However, these countermeasures involve the effect or restriction of magnetic properties or mechanical properties of magnetic discs. Therefore, in magnetic discs, improvement of circumferential magnetic orientation or obtaining a high Hc (coercive force) is intended to achieve. Further, as a countermeasure of narrow spacing between head and disc, it is necessary to secure a smooth surface without a small and fine projection. Under such circumstances, it is a glass substate which is a smooth base to be noted. In this point if magnetic property which has been obtained in conventional NiP/Al substrate is secured, hopeful high density magnetic recording medium is considered to be undoubtly obtainable.

However, even if a glass substrate is subjected to texturing treatment similarly to the conventional to film form Cr or Co alloy, magnetic anisotropy is isotropic in surface. A result similar to this case is caused irrespective of texturing treatment on a glass substrate and therefore it is proved that texturing treatment has no advantage. As magnetic anisotropy lacks as mentioned above, there has been such a disadvantage that, in a similar sputtering condition, the value of Hc becomes low comparing with said conventional NiP texturing/Al substrate.

SUMMARY OF THE INVENTION

The object of this invention is to overcome this disadvantage and to provide, by using a glass substrate, a magnetic recording material comprising a magnetic disc, which has magnetic anisotropy in a circumferential direction, provided with magnetic properties similarly to that obtained by conventional NiP/Al substrate.

Thus, this invention provides a magnetic recording medium which forms so that an axis of easy magnetization may become a circumferential direction by forming a precoat layer on a circular glass substrate provided with texturing treatment in a circumferential direction and by forming in order an undercoat film and a magnetic film on this precoat layer.

DETAILED DESCRIPTION OF THE INVENTION

Hereinunder, this invention is detailedly illustrated. A glass substrate to which texturing treatment is applied is at first prepared. This glass substate is a circular or disc-like glass plate, having a predetermined outer diameter, inner diameter and thickness, which is particularly prepared for a magnetic disc. There is not used a tempered glass on surface of which texturing treatment cannot be applied as the material of the glass plate. When performing texturing treatment, fine scratches are circumferentially caused on the surface of a predetermined glass substrate by means of a grinding tape and at that time surface roughness (Ra) is made as 10 to 100 Å.

On the glass substrate thus prepared is formed a precoat layer. As the precoat layer, substances for not disturbing crystal growth of any of metals and alloys subsequently used for an undercoat film, for example, Cr can be used. Examples of the substances used include Zr, W, V, Ti, Mo, NiP, WC and C. This precoat layer is normally formed by means of a sputtering process. The sputtering process condition such as the temperature of substrate, degree of vacuum or voltage are appropriately determined depending upon each material. The thickness of the precoat layer is 20 Å to 1 μm, preferably 50 to 1000 Å.

On the precoat layer thus formed is formed an undercoat film in accordance with a normal process. A Cr film is normally formed as this undercoat film. In addition to this film, metals or alloys, such as W, V or CrW, which are body centered cubic crystals (bcc) and have a spacing approximate to that of Cr can be frequently used. This undercoat film is normally formed by means of a sputtering process at a thickness of about 20 Å to 1 μm.

On this undercoat film is then formed a magnetic film. As this magnetic film, a Co alloy is generally used. As the Co alloy, there can be optionally used an alloy, which is alloyed to a degree of not breaking hexagonal close-packed (hcp) crystal structure of Co, such as CoNi, CoNiCr, CoCrPt, CoCrTa or CoCrTaPt. This magnetic film is formed to a thickness of about 100 to 3000 Å by means of a sputtering process under each optional condition.

As mentioned above, in accordance with this invention, a precoat layer is at first provided on a circular glass substrate texturing treated in a circumferential direction, without being directly provided with an undercoat film and then an undercoat film and magnetic film are formed in order, whereby magnetic anisotropy is formed by this substrate in a circumferential direction; the axis of easy magnetization can be formed so as to become a circumferential direction of the medium; and squareness ratio is improved compared with conventional products, attaining to obtaining a high density magnetic recording medium improved in surface smoothness and advantageous in narrow spacing between head and disc.

Hereinunder, Examples and Comparative Example are described to further illustrate this invention.

EXAMPLES

EXAMPLE 1

A glass substrate having an outer diameter of 95 mm, an inner diameter of 25 mm and a thickness of 1.27 mm was subjected to texturing treatment with a grinding tape so that Ra (surface roughness) might become 20 Å. The product thus obtained was used as a substrate and 60 Å NiP film was formed on the substrate by means of a direct current magnetron sputtering apparatus. In this time the temperature of the substrate was 200° C. and the sputtering gas pressure was 0.45 mTorr. Further, each of Cr and $CoCr_{11.5}Ta_4$ alloy film were formed at a thickness of 500 Å to make a magnetic recording medium (hereinafter, referred to as "medium").

EXAMPLE 2

The same manner as in Example 1 was repeated except that the thickness of the NiP film in Example 1 was changed to 500 Å to obtain a medium.

EXAMPLE 3

The same manner as in Example 1 was repeated except that the NiP film in Example 1 was changed to V film to obtain a medium.

EXAMPLE 4

The same manner as in Example 1 was repeated except that the NiP film in Example 1 was changed to carbon film having a thickness of 60 Å to obtain a medium.

EXAMPLE 5

The same manner as in Example 1 was repeated except that the NiP film in Example 1 was changed to Ti film having a thickness of 200 Å to obtain a medium.

EXAMPLE 6

The same manner as in Example 1 was repeated except that the NiP film in Example 1 was formed at a thickness of 60 A followed by forming CrW film at a thickness of 500 A by the use of a bias voltage of 300 V to form $CoCr_{11}Ta_4Pt_4$ alloy film at a thickness of 500 Å to obtain a medium.

Comparative Example

The same manner as in Example 1 was repeated except that NiP film was not formed, and Cr film and CoCrTa alloy film was formed to obtain a medium.

Magnetic properties of each medium of Examples 1 to 6 and Comparative Example prepared by the above method are shown in Table 1, where Rs is a squareness ratio and S* is a coercive force squareness ratio and further the unit of Hc is [Oe]. Concerning the respective values of the medium example, the value given in the upper column ① is a value determined by applying a magnetic field in a circumferential direction and the value given in the lower column ② is a value determined by applying a magnetic field in a radial direction.

As clearly seen from Table 1, it is understood that the medium which is provided with a precoat layer by forming NiP film, etc. is oriented in a circumferential direction and the medium without a precoat layer does not cause anisotropy. As the result of orientation in a circumferential direction, improvement of Rs (from 0.72 to the range of 0.80 to 0.85) is also seen and such as having about 1300 [Oe] or more of Hc can be obtained. This can be said a value sufficiently usable as a highly dense magnetic recording medium.

Meanwhile, as the magnetic property of the magnetic recording medium prepared by the use of the conventional NiP texturing/Al substrate has 0.82 of Rs, 1300 of Hc and 0.85 of S*, it is understood that the medium of the present invention has not inferior points to the conventional medium concerning these properties.

As mentioned above, according to the magnetic recording medium of the present invention, a precoat layer is formed on a glass substrate and, therefore, also in the glass substrate on which texturing treatment is applied, the medium which is oriented in a circumferential direction can be obtained and a rectangular ratio is improved comparing with the product of the conventional example. As the glass substrate is improved in surface property comparing with a NiP/Al substrate, it has an improved characteristic that is advantageous in refloatability and contribution to high densification.

TABLE 1

| | anisotopy | | Rs | Hc | S* |
|---|---|---|---|---|---|
| Example 1 | circumferential | ① | 0.81 | 1000 | 0.80 |
| | | ② | 0.69 | 780 | 0.74 |
| Example 2 | " | ① | 0.80 | 1260 | 0.87 |
| | | ② | 0.74 | 1200 | 0.78 |
| Example 3 | " | ① | 0.82 | 1280 | 0.85 |
| | | ② | 0.80 | 1240 | 0.78 |
| Example 4 | " | ① | 0.85 | 1345 | 0.93 |
| | | ② | 0.77 | 1200 | 0.82 |
| Example 5 | " | ① | 0.75 | 1340 | 0.93 |
| | | ② | 0.65 | 1200 | 0.78 |
| Example 6 | " | ① | 0.81 | 1680 | 0.92 |
| | | ② | 0.67 | 1500 | 0.80 |
| Comparative Example | isotropic | ① | 0.72 | 1130 | 0.84 |
| | | ② | 0.72 | 1130 | 0.84 |

What is claimed is:

1. A magnetic recording medium comprising:

a circular glass substrate;

a textured surface on one side of said glass substrate, said textured surface comprising fine scratches extending circumferentially on said one side of said substrate so that said textured surface has a surface roughness Ra of substantially 10–100 Å;

a precoat layer on said textured surface, said precoat layer having a thickness in a range of 20 Å to 1 μm and comprised of a material selected from the group consisting of Zr, W, V, Mo, WC and C;

an undercoat film on said precoat layer; and a magnetic film on said undercoat film, so that a magnetic anisotropy in a circumferential direction is formed and an axis of easy magnetization on said magnetic recording medium extends in a circumferential direction.

* * * * *